July 15, 1941.　　J. H. WALKER ET AL　　2,249,447
ALTERNATING CURRENT COMMUTATOR MOTOR CONTROL
Filed Feb. 27, 1941
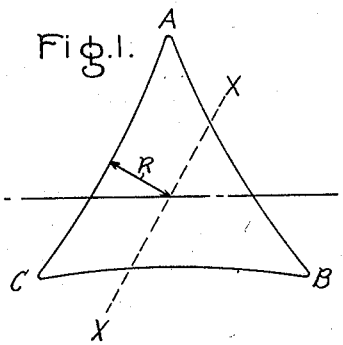
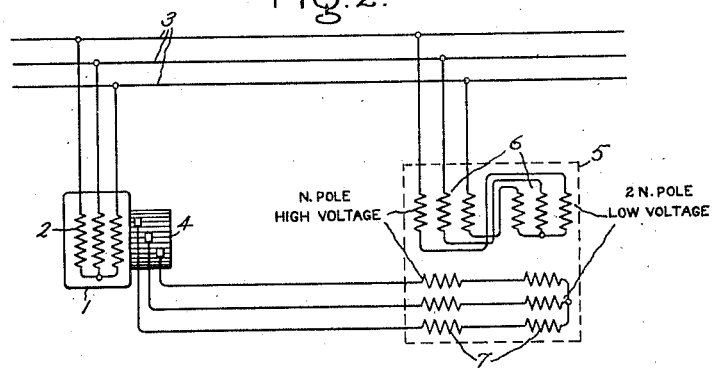
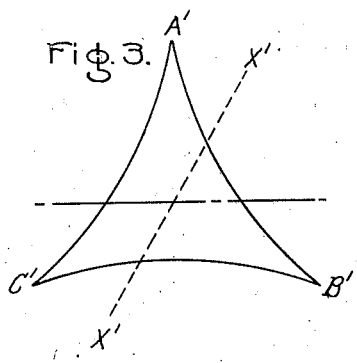
Inventors:
Jack H. Walker,
Bernard Adkins,
by Harry E. Dunham
Their Attorney.

Patented July 15, 1941

2,249,447

UNITED STATES PATENT OFFICE 2,249,447

ALTERNATING CURRENT COMMUTATOR MOTOR CONTROL

Jack H. Walker and Bernard Adkins, Rugby, England, assignors to General Electric Company, a corporation of New York Application February 27, 1941, Serial No. 380,924
In Great Britain March 4, 1940

3 Claims. (Cl. 172—274)

In British Patent No. 457,460 there is described and claimed the method of regulating the speed of a polyphase alternating current shunt commutator motor by supplying current to the commutator of the motor from the secondary of an induction regulator provided with windings, either on its primary or secondary, so arranged as to set up simultaneously fluxes having two different numbers of poles.

In the particular example therein described and illustrated, the regulator has a single core and stator and rotor elements are each provided with two windings of different numbers of poles, the primary windings being connected in parallel to the supply in a manner to set up fluxes rotating in opposite directions in the secondary windings which are connected in series to the motor commutator.

As pointed out in the above mentioned British Patent No. 457,460, the two secondary voltages need not be of equal value. However, if such a regulator is wound with equal two and four pole secondary voltages, then in moving the rotor through 360 mechanical degrees the extremity of the secondary voltage vector traces a three-limbed retrograde epicyclic curve. While such curve is tolerable for the regulation of small motor units, the large variation in power factor correction is a drawback in larger units.

According to the present invention the motor speed is regulated by a single core induction regulator in which the secondary voltages, which are connected in series to the motor commutator, are derived from fluxes rotating in opposite directions and giving pole numbers the one twice that of the other and in which the voltage of the smaller pole number winding is considerably in excess of that of the higher pole number winding, preferably in the ratio of three to one.

With the two secondary voltages differing by so large a proportion, there are occasions, such as when the primary is connected to a high voltage supply, when one of the primary windings would require a large number of turns per slot if these windings were connected in parallel. According, therefore, to a further feature of this invention, the two primary windings of the regulator are connected in series.

The accompanying drawing illustrates our invention. In the drawing, Fig. 1 is a diagram showing the focus of the resultant secondary voltage vector; Fig. 2 is a diagram of the preferred connections of the regulator; and Fig. 3 is similar to Fig. 1, but for a different ratio of secondary voltages.

Referring to the drawing, for a two-pole and a four-pole secondary voltages in the ratio of 3 to 1, the locus of the extremity of the combined secondary voltage vector, as applied to the motor commutator, will, with a mechanical rotation of the regulator through 360°, follow the figure A—B—C. The brushes of the motor commutator are so adjusted that the axis of the line voltage lies along X—X parallel to A—C. The working range of the regulator is then from A to C, which gives a constant power factor correction corresponding to the voltage component R.

A variety of suitable secondary locus characteristics may be obtained by varying the ratio of the secondary voltages. Fig. 3 shows the vector locus which travels over the curve A'—B'—C' in the case where the ratio of two pole voltage to four pole voltage is two to one.

If the amount of the power factor correction R in Fig. 1 is too large, this can be reduced by known means, such as by an auxiliary winding on the motor stator.

In Fig. 2 the shunt commutator polyphase motor is represented at 1, the stator winding 2 of which is connected to the polyphase supply 3. The commutator 4 is connected to the series connected secondary windings 7 of the induction regulator 5. The primary windings 6 of the regulator are connected in series to the supply 3.

It will be seen that providing a number of poles on the one secondary winding that is a multiple of those of the other winding and of opposite polar rotation, and making the voltage of the winding having the smaller number of poles a multiple of the voltage of the other secondary winding, a power factor correction voltage can be injected to the motor through the commutator brushes, which can be made approximately constant throughout the range of speed regulation of the motor.

What we claim as new and desire to secure by Letters Patent of the United States is:

1. A control system comprising a polyphase shunt alternating current commutator motor, a polyphase source of supply therefor, an induction regulator having a single core structure, two primary windings and two secondary windings, means connecting the primary windings in series to said source of supply and means connecting the secondary windings in series to the commutator of said motor, one of the primary and secondary windings of said induction regulator having twice as many poles and approximately one-third the voltage transformation ratio as the other primary and secondary winding thereof, said different pole number windings being connected to produce opposite phase rotation secondary voltages in the series circuit connection to the motor commutator.

2. Apparatus for regulating the speed of polyphase alternating current shunt commutator motors consisting of an induction regulator having a single core, the stator and rotor being each provided with two windings of N and 2N numbers of poles, the primary windings being connected in series with reversed phase rotation and the secondary windings being connected in series to the commutator of the motor to be regulated, the windings of smaller pole number having a transformation ratio of not less than twice the transformation ratio of the windings of larger pole number.

3. A control system comprising a polyphase shunt alternating current commutator motor, a source of supply therefor, and induction regulator apparatus connected between the source of supply and the commutator of said motor, said induction regulator apparatus having two sets of primary and secondary windings and a common core, one primary and secondary winding set having twice the pole number and approximately one-third the voltage transformation ratio as the other set, the secondary windings being connected in reversed phase rotation series relation to the commutator of the motor.

JACK H. WALKER.
BERNARD ADKINS.